US009041557B2

(12) United States Patent
Tannemaat et al.

(10) Patent No.: US 9,041,557 B2
(45) Date of Patent: May 26, 2015

(54) METHOD FOR MAKING A PARKING ARRANGEMENT EQUIPPED WITH AN AUTOMATIC VEHICLE DETECTION SYSTEM READY FOR OPERATION, AND PARKING ARRANGEMENT FOR USE OF THE METHOD

(75) Inventors: Gerhard Johan Tannemaat, Groenlo (NL); Jasper Rikhof, Haaksbergen (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 167 days.

(21) Appl. No.: 13/981,663

(22) PCT Filed: Feb. 6, 2012

(86) PCT No.: PCT/NL2012/050063
§ 371 (c)(1),
(2), (4) Date: Oct. 3, 2013

(87) PCT Pub. No.: WO2012/108763
PCT Pub. Date: Aug. 16, 2012

(65) Prior Publication Data

US 2014/0022095 A1 Jan. 23, 2014

(30) Foreign Application Priority Data

Feb. 7, 2011 (NL) ..................................... 2006154

(51) Int. Cl.
*B60Q 1/48* (2006.01)
*G08G 1/14* (2006.01)
*G08G 1/017* (2006.01)

(52) U.S. Cl.
CPC .................. *G08G 1/141* (2013.01); *G08G 1/14* (2013.01); *G08G 1/017* (2013.01); *G08G 1/142* (2013.01); *G08G 1/144* (2013.01); *G08G 1/146* (2013.01)

(58) Field of Classification Search
CPC ......... G08G 1/017; G08G 1/14; G07B 15/02; B60T 2201/10
USPC ................................. 340/932.2, 10.52, 539.1
See application file for complete search history.

(56) References Cited

U.S. PATENT DOCUMENTS

| | | | | |
|---|---|---|---|---|
| 6,771,185 | B1 * | 8/2004 | Yoo et al. | 340/932.2 |
| 7,973,641 | B1 * | 7/2011 | Huang | 340/539.32 |
| 8,493,237 | B2 | 7/2013 | Grievink et al. | |
| 2011/0102197 | A1 * | 5/2011 | Herwich | 340/932.2 |
| 2012/0280836 | A1 * | 11/2012 | Roesner | 340/932.2 |
| 2013/0253879 | A1 * | 9/2013 | Tannemaat | 702/150 |

FOREIGN PATENT DOCUMENTS

| | | | |
|---|---|---|---|
| NL | 2001994 | | 9/2008 |
| WO | 2009/117755 | A2 | 10/2009 |

* cited by examiner

*Primary Examiner* — John A Tweel, Jr.
(74) *Attorney, Agent, or Firm* — Jacobson Holman, PLLC

(57) ABSTRACT

Parking arrangement and method for making a parking arrangement equipped with an automatic vehicle detection system ready for operation, which parking arrangement comprises a central computer with a database and at least a number of parking places identifiable by a location code, which parking places are each provided with at least one wirelessly operating parking sensor module, which is connected with the central computer via a UHF radio link and which is provided with an identification code, which parking sensor module comprises at least one vehicle sensor which in operation provides measuring values representative of the presence or absence of a vehicle in the respective parking place, wherein use is made of parking sensor modules which have an RFID identification circuit in which the identification code is stored, which identification code is wirelessly readable.

15 Claims, 5 Drawing Sheets

METHOD FOR MAKING A PARKING ARRANGEMENT EQUIPPED WITH AN AUTOMATIC VEHICLE DETECTION SYSTEM READY FOR OPERATION, AND PARKING ARRANGEMENT FOR USE OF THE METHOD

This is a national stage of PCT/NL12/050063 filed Feb. 6, 2012 and published in English, which has a priority of The Netherlands no. 2006154 filed Feb. 7, 2011, hereby incorporated by reference.

The invention relates to a method for making a parking arrangement equipped with an automatic vehicle detection system ready for operation, which parking arrangement comprises a central computer with a database and at least a number of parking places identifiable by a location code, which parking places are each provided with at least one wirelessly operating parking sensor module which is connected with the central computer via a UHF radio link, and which is provided with an identification code, which parking sensor module comprises at least one vehicle sensor which in operation provides measuring values which are representative of the presence or absence of a vehicle in the respective parking place.

In the following description, "parking place" is understood to mean a parking spot or a parking bay or parking space for a single vehicle. "Parking arrangement" is understood to mean an array of a number of parking places, such as, for instance, a parking lot, a parking garage, a parking zone, a parking lane or the like. "Vehicle" is understood to mean any type of vehicle that can be placed in a parking place, such as, for instance, a passenger car, a van, a camper, an autobus, trailer, etc.

An example of a parking arrangement in which the present invention can be used is described in Dutch patent 2001994. During or after physically laying out a parking arrangement as described in Dutch patent 2001994 or a similar parking arrangement, whereby the parking places are marked out and each parking place is provided with a number and with a parking sensor module, also named sensor node, provided with an identification code, a coupling needs to be made in the database of the central computer between the individual identification codes of the different sensor nodes and the number and/or the coordinates of the associated parking places.

Further, from WO 2009/117755 A2 an automated parking guidance and management system is known, in which parking sensor modules are used that can indicate the status of a parking place (occupied, vacant, occupied but not paid for, etc.) by means of light signals. These parking sensor modules are connected via cable work with connecting modules, which in turn are connected with a central computer via cable work and/or wirelessly. These known parking sensor modules are furthermore provided with an RFID reader, which can read out an RFID tag carried along in or on a car. This reference, however, does not describe a method for bringing a parking arrangement of the above-described type in a condition ready for operation, prior to opening to vehicles to be parked.

According to a customary practice, an identification code provided on a sensor node, typically a number, is read and noted down by an operator. Thereafter, on a floor plan of the parking arrangement a code designation, such as, for example, a number or the coordinates of the respective parking place, is looked up and noted down next to the just-noted identification number of the sensor node, or the other way around. This is done for all parking places of the parking arrangement and the thus obtained information is manually inputted into the database of the central computer. This is sometimes designated as locating process.

This is a laborious process, which can easily entail errors. The number of the sensor node, for example, may be poorly legible and hence, or for another reason, be misread, or be noted down incorrectly or be noted down in association with the wrong parking place. When the layout of the parking arrangement is changed, which occurs regularly, especially in the case of open-air lots, the same process needs to be traversed again, and once again errors may occur.

The object of the invention is to improve this process and to reduce the chance of errors. To this end, according to the invention, a method of the above-described type is characterized in that use is made of parking sensor modules which have an RFID identification circuit, in which the identification code is stored, which identification code is wirelessly readable.

A parking arrangement according to the invention is characterized in that at least a number of parking places of the parking arrangement are each provided with at least one parking sensor module, which parking sensor module is provided with an RFID identification circuit, in which a wirelessly readable identification code is stored.

It is noted that in the parking guidance and management system known from WO 2009/117755 A2 the parking sensor modules do not contain an RFID identification circuit.

In the following, the invention will be described in more detail with reference to the appended drawings.

Figure 1:
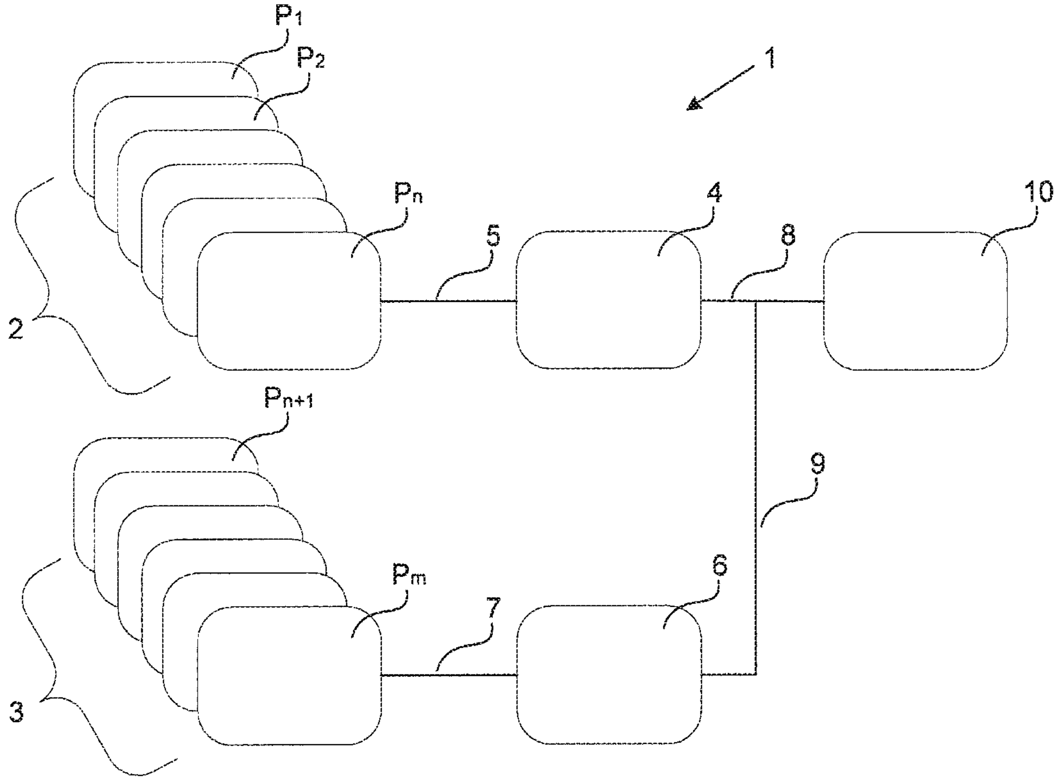
FIG. 1 shows schematically an example of a vehicle detection system for a parking arrangement.

FIG. 1 shows schematically an example of a vehicle detection system 1 for a parking arrangement according to the invention. The vehicle detection system shown comprises a number of parking sensor modules, also named sensor nodes, indicated with P1, P2, . . . Pn, Pn+1, . . . Pm. The sensor nodes correspond to the different parking places of the parking arrangement. The sensor nodes are typically, but not necessarily, divided into a number of groups, whereby the sensor nodes of a group can communicate with an intermediate station, which in turn can communicate with the central computer of the vehicle detection system.

In the example shown, the sensor nodes P1 . . . Pn form a first group 2 and the sensor nodes Pn+1 . . . Pm form a second group 3. Group 2 can communicate with an associated intermediate station 4 via a connection 5, while group 3 can communicate with an intermediate station 6 via a connection 7.

The intermediate stations 4 and 6 can communicate with the central computer 10 via connections 8, 9. The connections 5, 7, 8, and 9 could, if desired, consist wholly or partly of wired connections, but are preferably wireless connections. When in a parking place a condition change occurs, as a result of a vehicle arriving or leaving, this is detected by the sensor node associated with that parking place and passed on via the associated intermediate station to the central computer.

It is noted that a parking arrangement can also be so configured that the sensor nodes communicate directly, or via other sensor nodes, with the central computer without intervention of intermediate stations such as the intermediate stations 4 and 6.

It is further noted that, if desired, it is possible to provide a parking place with more than one sensor node. In the present description of an exemplary embodiment of the invention, the starting point is an automatic vehicle detection system with a single sensor node per parking place. Furthermore, more or fewer than two groups of sensor nodes may be used depending on the nature of the parking arrangement.

Figure 2:
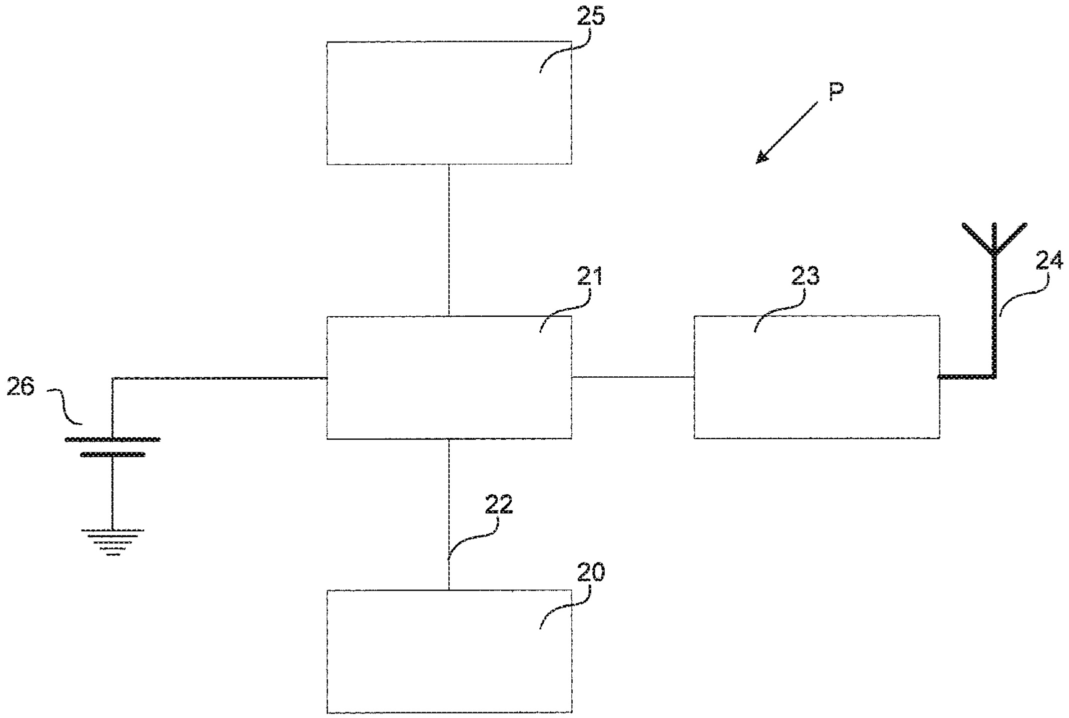
FIG. 2 shows schematically a block diagram of an example of a parking sensor module according to the invention.

FIG. 2 shows schematically the structure of an example of a parking sensor module P for use in a method or arrangement according to the invention. In the example shown, the parking sensor module (sensor node) P comprises a vehicle sensor 20, which can comprise, for example, one or more magnetic sensors, such as described, for example, in applicant's Dutch patent 2001994. The vehicle sensor 20 is connected with a microcontroller 21, which receives signals generated by the vehicle sensor via a connection 22, processes them and transmits them to the central computer via a radio link with a transmitter/receiver 23 and an antenna 24. Communication between the sensor nodes mutually may also take place via this radio link. The radio link is usually a UHF link.

The sensor node in this example furthermore comprises a low-frequency (LF) transmitter/receiver 25 with an LF antenna not shown separately. The transmitter/receiver 25 forms an RFID (Radio Frequency Identification Device) transponder, whose function will be further elucidated hereinbelow. Further, the sensor node is provided with a battery 26 for providing supply voltage to the different circuits of the sensor node.

Figure 3:
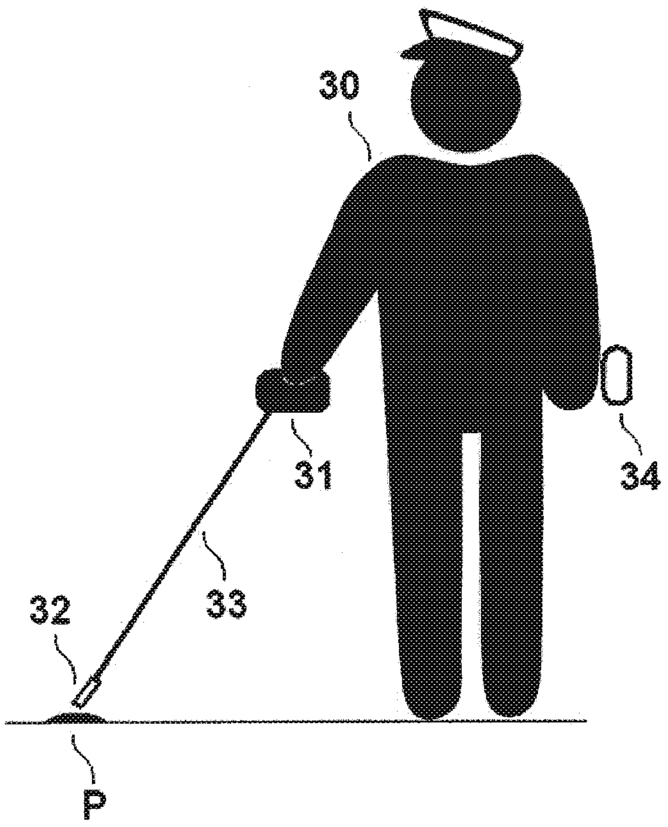
FIG. 3 illustrates schematically an exemplary embodiment of a method according to the invention.

FIG. 3 illustrates schematically a method according to the invention. The figure shows an operator 30 having in one hand a portable or mobile RFID reader 31, whose antenna 32 arranged on an extension stick 33 is held close to a sensor node P. The reader 31, if desired, may also be mounted lower on the stick 33 or may even, in a single housing together with the antenna, be attached to the distal end of the stick. However, the reader may also be connected to the antenna with a wire, via the stick or not so, and be worn elsewhere on the body of the operator, for example, suspended from his belt or on his back. With the aid of the reader, the RFID transponder 25, in which the identification code, typically consisting of just a number, of the sensor node P is electronically stored, can be read out. The reader 31 is coupled, for instance via Bluetooth, with a so-called smartphone 34, carried along by the operator, and the read-out identification code of the sensor node P is automatically stored in the memory of the smartphone. The operator now only needs to input the location code, such as, for example, the number or the coordinates of the parking place, into the memory of the smartphone manually and forward it to the central computer 10 at a suitable time.

As the identification code of the sensor node is automatically read and electronically stored in the smartphone, the chance of errors is reduced considerably. If the parking places are consecutively numbered, the chance of errors can be further reduced by an automatic or semiautomatic increase or decrease of the parking place number in the smart phone application. Automatic increase or decrease may be done by coupling this to the input of a next identification code of a sensor node. For semiautomatic increase/decrease, for example, a button on the smartphone programmed for that purpose may be utilized.

The locating process may be further supported by utilizing a positioning system. To this end, for example, the GPS function of the smartphone may be utilized to input the coordinates of the parking place associated with a sensor node into the memory of the smartphone and to couple it to a sensor node identification code which has been read or is to be read with the reader 31.

The current possibilities of the GPS system, whether or not still adversely affected by the so-called Urban Canyon effect, do not always provide sufficient accuracy of the position determinations, so that in such situations the GPS function cannot wholly replace the manual input of parking place numbers or coordinates or the above-described automatic or semiautomatic increase/decrease of the parking place numbers. On the other hand, it does allow large deviations in the input, for example due to typing errors, to be signaled and then corrected.

Through the planned introduction of a more accurate positioning system, such as, for example, the European Galileo system, positioning by means of a satellite system is expected to improve considerably. Manual input of the position data might then become redundant.

The RFID transponder 25 of the sensor nodes can also be used for logistics during the production of the sensor nodes.

For normal operation, i.e., relaying parking information, communication between the sensor nodes mutually and from the nodes to the central computer takes place via a UHF radio link, as indicated in FIG. 1 at 5, 7, 8, and 9 and in FIG. 2 at 23, 24. However, for communication between a sensor node P and the reader 31, UHF signals are less suitable. Due to the large range of UHF signals and the small distance between adjacent sensor nodes, it is not always certain that with a reader suitable for UHF signals the correct identification code of a sensor node is registered if the automatic identification of the sensor nodes were carried out via the UHF link 23, 24.

A solution to this problem is to utilize a low-frequency RFID method, as has already been described hereinabove.

The low-frequency transmitter/receiver 25 may be utilized, in a similar manner to that described in applicant's older Dutch patent application NL2005776, understood to be incorporated herein by reference, to determine the distance of each sensor node to neighboring sensor nodes. By their nature, the sensor nodes are normally all situated substantially in the same horizontal plane. As the sensor nodes are located close to each other, typically at a mutual distance in the order of 2.5 to 3 meters, in the use of magnetic fields low frequencies are employed in the so-called near field. In this near field it holds that the relation between field strength and distance r to the transmitter is inversely proportional to the third power of the distance r. Hence, the field strength at a distance r from an LF transmitter is proportional to $1/r^3$ and is a measure of the distance between the transmitter and the receiver.

By successively using a transponder circuit 25, or at least its antenna coil, of one of the sensor nodes as LF transmitter and using the transponder circuits of the other sensor nodes as LF receiver, it is possible, with the thus determined distances between the different nodes and utilizing algorithms known per se, to make by software a kind of ground plan of the relative location of the sensor nodes with respect to each other. For successively activating one of the sensor nodes as LF transmitter while the other sensor nodes operate as LF receiver, existing techniques can be utilized. A suitable technique is the so-called TDMA (Time Division Multiple Access) method. This technique can be used for the UHF communication of the nodes, and the means then present for this purpose anyway can also be used to determine, under the control of the central computer and/or the microcontrollers 21, by means of LF communication between the nodes, the relative location of the nodes with respect to each other.

Since in each case just one of the sensor nodes works in the transmission mode, accordingly, in contrast with the system described in NL 2005776, just one transmission frequency needs to be employed. Having regard to applicable regulations, the transmission frequency can be in the range of about 30 kHz to about 70 kHz, for instance, around 50 kHz.

The map of the relative location of the sensor nodes with respect to each other can, together with the plan of the physical parking arrangement itself, be represented on the display of the central computer 10.

Figure 4:
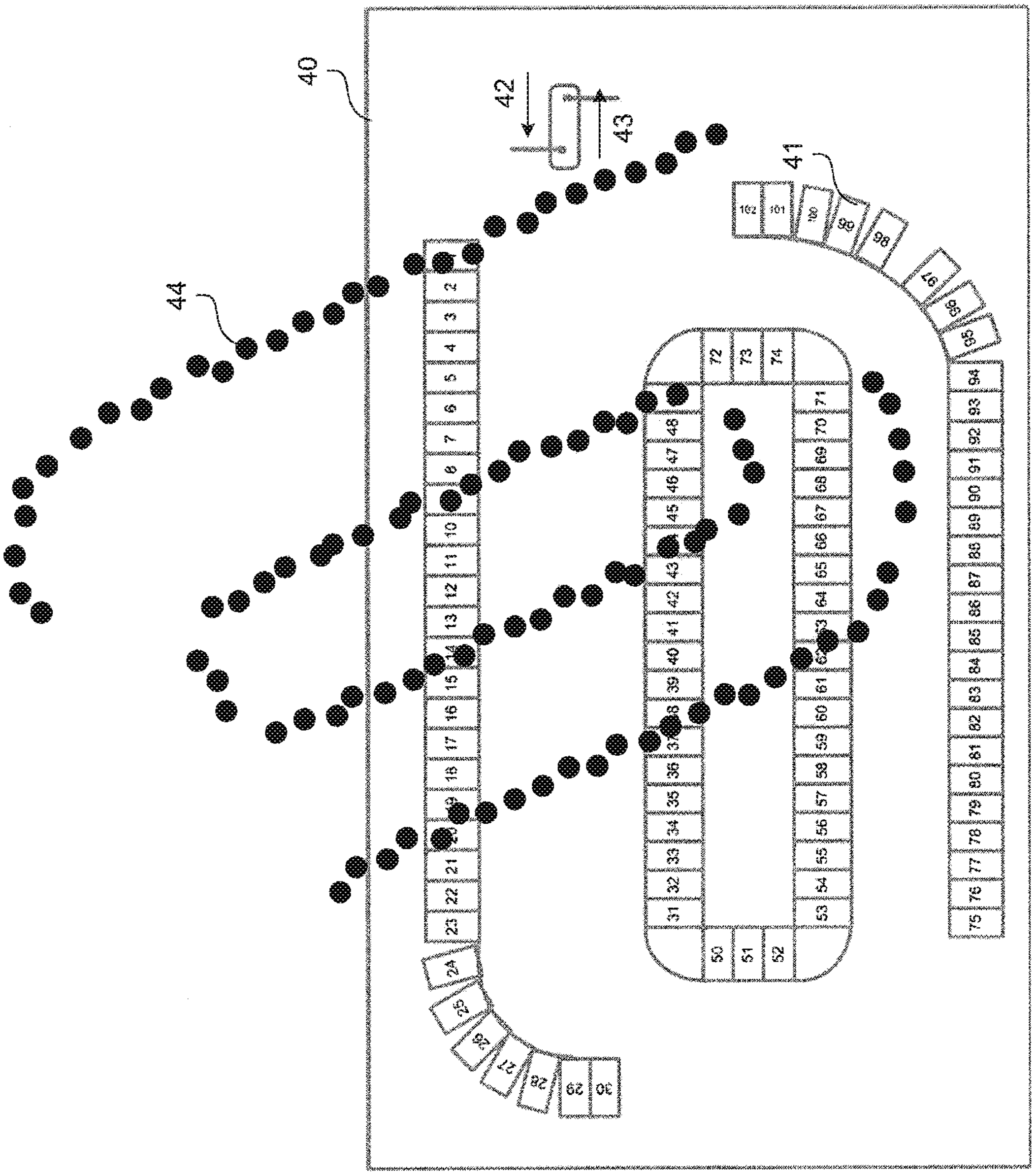
FIGS. 4 and 5 illustrate schematically how the relative location of the parking sensor modules can be matched with the geographic position of the corresponding parking places.

FIG. 4 shows schematically an example of a ground plan of a parking arrangement 40 with the parking places 41 and an entrance 42 and an exit 43 indicated thereon. Further, FIG. 4 shows the map 44 of the relative location of the sensor nodes with respect to each other. The ground plan may be drawn in a usual manner and be inputted in the computer, but optionally the maps of Google Maps may be utilized for this purpose. The coordinates of the parking places can be simply obtained therefrom.

Figure 5:
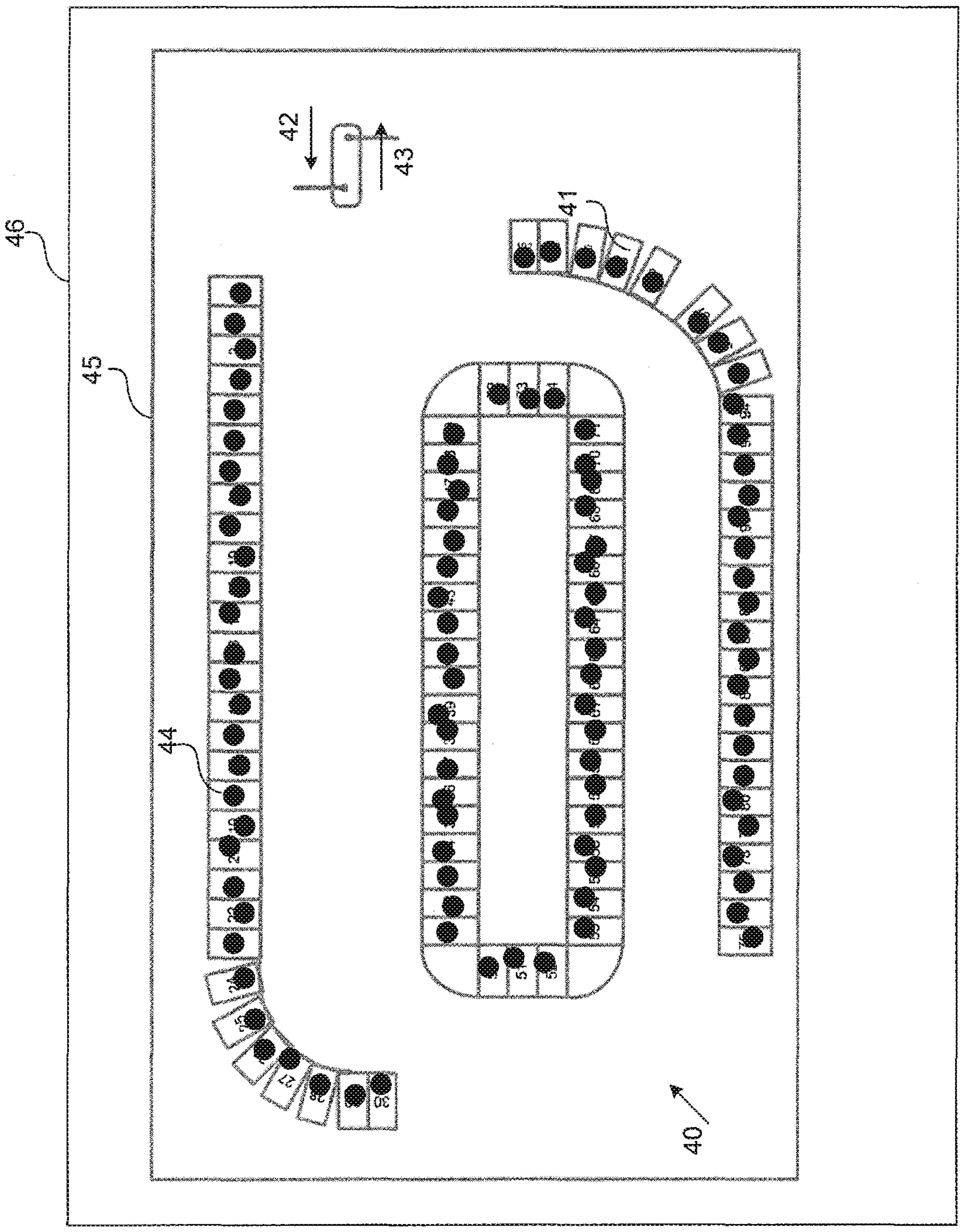

With some forms of the layout of the parking places, the map 44 of the sensor nodes can be laid on the map 41 of the parking places so as to match it in a simple manner by shifting and/or turning and/or enlarging or reducing. Thus, the identification codes of the sensor nodes are unequivocally coupled to the physical parking places. This is the case with the parking arrangement 40 shown in FIG. 4. FIG. 5 shows how the map 44 of the sensor nodes has been laid on the map of the parking places on the display 45 of a monitor 46 of the central computer 10 with an unequivocal match.

In principle, it is not necessary then to manually couple the identification codes of the sensor nodes to the geographical position of the parking places with the aid of the reader 31. For checking purposes, of course, the reader can still be used.

In cases where the map of the sensor nodes can be laid on the map of the parking places in several matching ways, it is necessary to couple the codes of a small number of sensor nodes to the associated physical parking places. The operator can do this in the manner already described with the aid of the reader 31 and the smartphone 34.

The determination of the distance between a sensor node and the other sensor nodes situated in the surroundings of that sensor node with the aid of low-frequency magnetic fields provides a very reliable result. The low-frequency signals, unlike UHF signals, are not influenced, or influenced to a very minor extent only, by the surroundings.

It is also possible, however, to use the UHF communication link between the sensor nodes and the central computer to automatically make, with the aid of suitable software, a map of the relative location of the sensor nodes with respect to each other. To promote a reliable and fast communication between the sensor nodes and the central computer, additional intermediate stations (relay nodes) can be used, such as indicated, for example, at 4 and 6 in FIG. 1. In view of the so-called Brewster angle effect, these intermediate stations are preferably mounted high, for example, in a lamppost or a special pole or to the wall of a building or the like.

With a number of those intermediate stations, the difference in transmission time of UHF signals from sensor nodes to the intermediate stations can be determined. Based on the difference in transmission time, the positions of the sensor nodes with respect to the intermediate stations can be calculated. Utilizing modern techniques for phase measurements, known per se, the different transmission times can be simply calculated.

As soon as the location of the sensor nodes with respect to the intermediate stations is known, again a plan of the location of the sensor nodes can be made, which can thereupon be depicted on the geographical plan of the parking places, in the manner illustrated in FIGS. 4 and 5.

It is also possible to provide a number of sensor nodes and/or intermediate stations with a GPS receiver or a comparable receiver, so that the geographical position of these sensor nodes and/or intermediate stations is already fixed and the coupling between the parking places and the sensor nodes can take place automatically. The reader 31 and the smartphone may then be used for checking and correction purposes only.

The just-described UHF method is less accurate than the earlier-described LF method, though expectably this will not be a drawback at least in a number of situations, depending on nature and location of the parking arrangement.

It is noted that after the foregoing diverse modifications and variants will be clear to those skilled in the art. Thus, the reader 31 with the associated antenna may be carried along by the operator in various manners. For example, instead of a stick for the antenna of the reader 31, or in combination therewith, also a kind of small cart with wheels can be used, to which the antenna is attached. Such a cart could also be provided with propelling means and with a seat for the operator. Such modifications and variants are understood to be within the purview of the invention, as described in the appended claims.

The invention claimed is:

1. A method for making a parking arrangement equipped with an automatic vehicle detection system ready for operation, which parking arrangement comprises a central computer with a database and at least a number of parking places identifiable by a location code, which parking places are each provided with at least one wirelessly operating parking sensor module which is connected with the central computer via a UHF radio link and which is provided with an identification code, which parking sensor module comprises at least one vehicle sensor which in operation provides measuring values which are representative of the presence or absence of a vehicle in the respective parking place, wherein use is made of parking sensor modules which have an RFID identification circuit, in which the identification code is stored, which identification code is wirelessly readable.

2. The method according to claim 1, wherein the identification codes of the individual parking sensor modules are coupled in the database of the central computer to the location codes of the individual parking places by reading out in each case the identification code of a parking sensor module of a parking place with a wirelessly operating reader and storing it in a memory together with the location code of the parking place inputted manually in the memory.

3. The method according to claim 2, wherein as memory the memory of a smartphone is used, which smartphone is wirelessly coupled with the reader and via which the data inputted into the memory are sent to the database of the central computer.

4. The method according to claim 1, wherein a reader is used with an antenna placed at a distance, so that the antenna can be simply brought close to a parking sensor module by an operator for reading out an identification code.

5. The method according to claim 1, wherein the parking places are provided with consecutive numbers as location codes and that the smartphone is programmed, upon each input of an identification code of a parking sensor module, to automatically or semiautomatically increase or decrease the number of the parking place, so that manual input of the location codes is not necessary.

6. The method according to claim 3, wherein at least as support for determining the location of individual parking places, use is made of a position determining function of the smartphone.

7. The method according to claim 1, wherein the RFID identification circuit of the parking sensor modules is a low-frequency circuit, and that for creating a map of the relative location of the parking sensor modules with respect to each other use is made of a distance determination of the parking sensor modules with respect to each other by each time using the RFID identification circuit of each time one parking sensor module as transmitter for generating a low-frequency magnetic field and using the parking sensor modules in the surroundings to receive the magnetic field and to measure the strength thereof at the receiver.

8. The method according to claim 1, wherein for the UHF radio link between the parking sensor modules and the central computer use is made of high-placed intermediate stations and that at least a number of those intermediate stations are used to determine the transmission time differences of signals transmitted between the parking sensor modules and the intermediate stations with the aid of phase measuring techniques, after which on the basis of the transmission time differences in the central computer a map of the relative location of the parking sensor modules with respect to each other is created.

9. The method according to claim 7, wherein on the display of the central computer the map of the relative location of the parking sensor modules with respect to each other is depicted together with a map of the geographical location of the parking places and that the parking places are coupled to the parking sensor modules by depicting the map of the parking sensor modules on a map of the parking places in a matching manner by shifting and/or turning and/or enlarging or reducing.

10. The method according to claim 8, wherein at least a number of the intermediate stations are provided with a position determining module and that for coupling the parking sensor modules to the geographical positions of the parking places use is made of the position information obtained by means of the position determining modules.

11. A parking arrangement for use of a method according to claim 1, wherein at least a number of parking places of the parking arrangement are each provided with at least one parking sensor module, which parking sensor module is provided with an RFID identification circuit, in which a wirelessly readable identification code is stored.

12. The parking arrangement according to claim 11, wherein the parking sensor modules are provided with a low-frequency operating transmitter/receiver for respectively transmitting and receiving a magnetic field and with means of measuring the strength of a received magnetic field.

13. The parking arrangement according to claim 12, wherein the low-frequency operating transmitter/receiver is coupled with the antenna coil of the RFID identification circuit.

14. The parking arrangement according to claim 11, wherein the parking sensor modules are configured to communicate with a central computer via a high-frequency radio link via an intermediate station, characterized in that at least a number of intermediate stations are placed high and are provided with means to determine the transmission time differences of signals coming from different parking sensor modules.

15. The parking arrangement according to claim 14, wherein at least a number of the high placed intermediate stations are provided with a position determining device.

* * * * *